US012560319B1

(12) United States Patent
Lai

(10) Patent No.: US 12,560,319 B1
(45) Date of Patent: Feb. 24, 2026

(54) WATERPROOF LAMP

(71) Applicant: Wenrui Lai, Guangdong (CN)

(72) Inventor: Wenrui Lai, Guangdong (CN)

( * ) Notice: Subject to any disclaimer, the term of this patent is extended or adjusted under 35 U.S.C. 154(b) by 0 days.

(21) Appl. No.: 19/237,243

(22) Filed: Jun. 13, 2025

(51) Int. Cl.
*F21V 31/00* (2006.01)
*F21V 1/14* (2006.01)
*F21V 17/12* (2006.01)
*F21W 131/10* (2006.01)

(52) U.S. Cl.
CPC ............ *F21V 31/005* (2013.01); *F21V 1/143* (2013.01); *F21V 17/12* (2013.01); *F21W 2131/10* (2013.01)

(58) Field of Classification Search
CPC ...................................................... F21V 31/005
See application file for complete search history.

(56) References Cited

U.S. PATENT DOCUMENTS

| | | | | |
|---|---|---|---|---|
| 10,871,276 | B1 | 12/2020 | Lan et al. | |
| 11,098,882 | B2 | 8/2021 | Zhang | |
| 11,944,073 | B1 | 4/2024 | Lan et al. | |
| 2006/0002116 | A1 | 1/2006 | Lin | |
| 2006/0181883 | A1 | 8/2006 | Hsu | |
| 2012/0188754 | A1 * | 7/2012 | Fitzwater, II | F21S 9/02 362/183 |
| 2013/0051079 | A1 * | 2/2013 | Xu | F21S 4/10 362/640 |

FOREIGN PATENT DOCUMENTS

| | | | | |
|---|---|---|---|---|
| CN | 2667305 | Y | * 12/2004 | |
| CN | 106015979 | A | * 10/2016 | F21V 17/18 |
| CN | 212107915 | U | * 12/2020 | |
| CN | 219014258 | U | * 5/2023 | |
| CN | 222578188 | U | * 3/2025 | |

* cited by examiner

*Primary Examiner* — Fatima N Farokhrooz

(57) ABSTRACT

A waterproof lamp includes a lamp holder on which a bulb and a protective cover are mounted, and the protective cover is located outside the bulb. A mounting seat is arranged at the top of the lamp holder, and the bulb is mounted at the top of the mounting seat. A mounting disc is arranged on the lamp holder, the mounting seat extends through the mounting disc, and a bottom end of the protective cover is mounted in the mounting disc. A top end of the protective cover is hemispherical. An outer edge of the mounting disc extends upward to form a circular ring, and an inner side of the circular ring is mounted and connected with the bottom end of the protective cover.

9 Claims, 7 Drawing Sheets

WATERPROOF LAMP

TECHNICAL FIELD

The embodiments of the present disclosure relate to the technical field of outdoor lighting, and in particular, to a waterproof lamp.

BACKGROUND

In the related art, with the increasing popularity of outdoor sports such as outdoor camping, fishing and courtyards, outdoor table lamps have found more application scenarios and usage demands.

However, traditional table lamps, originally designed for indoor use, have exposed bulb components. When directly used outdoors, especially in rainy weather or other specific conditions, the bulb is prone to get wet, easily leading to short circuits or burnouts, and thus fail to operate properly, and thereby resulting in unsatisfactory outdoor applicability.

In addition, a lamp cover in the related art is mostly mounted through screw fixing, making it difficult to disassemble the lamp cover conveniently in different usage scenarios.

SUMMARY

The present disclosure proposes a waterproof lamp, which solves the problem in the related art where, under special conditions such as rainy weather, the bulb is prone to get wet, leading to short circuits or burnouts, and thus fail to operate properly, thereby resulting in unsatisfactory outdoor applicability.

In order to solve the above technical problem, the technical solution employed by the present disclosure is as follows.

A waterproof lamp includes a lamp holder. A bulb and a protective cover are mounted on the lamp holder, and the protective cover is located outside the bulb. A mounting seat is arranged at the top of the lamp holder, and the bulb is mounted at the top of the mounting seat. A mounting disc is mounted on the lamp holder, the mounting seat extends through the mounting disc, and a bottom end of the protective cover is mounted in the mounting disc. A clamping member in the mounting disc is engaged into a clamping groove in the bottom of the protective cover, allowing convenient mounting and fixation. The clamping member and the clamping groove are engaged through spiral rotation, enabling the protective cover to be rotated and locked into place during the downward insertion into the mounting disc.

In some implementations, a top end of the protective cover is hemispherical. An outer edge of the mounting disc extends upward to form a circular ring, and an inner side of the circular ring is mounted and connected with the bottom end of the protective cover. The bottom end of the protective cover is insertable into the inner side of the circular ring of the mounting disc, enabling insertion and fixation in both up and down directions.

In some implementations, the bottom end of the protective cover is provided with a bottom ring, an outer ring surface of the bottom ring is mounted and connected with an inner ring surface of the circular ring of the mounting disc.

In some implementations, the bottom ring is in threaded connection with the circular ring of the mounting disc.

In some implementations, the outer ring surface of the bottom ring is provided with a plurality of tightening grooves, and the inner ring surface of the circular ring of the mounting disc is provided with a plurality of convex balls; and the tightening grooves are clamping grooves, and the convex balls are clamping members.

In some implementations, the tightening grooves are oblique grooves, allowing easy rotation, insertion and disassembly during the mounting process.

In some implementations, a smooth edge is arranged at the top of the circular ring of the mounting disc, and an outer diameter of the protective cover is greater than an outer diameter of the mounting disc.

In some implementations, a mounting ring is arranged at an outer side of the lamp holder, and an outer cover is mounted outside the mounting ring.

In some implementations, the outer cover is mounted on the mounting ring through a connecting frame, and the outer cover surrounds the protective cover.

In some implementations, the outer cover is in the shape of a truncated cone with a small top and a large bottom, the interior of the outer cover is hollow, and the entire outer cover is in the shape of a cylinder running through from top to bottom.

The present disclosure has positive effects that:

when used outdoors, the protective cover is located at the outer side of the bulb, which can prevent external wind and rain, as well as debris, and isolate dust from the outside, ensuring that the bulb can operate properly, and improving the environmental adaptability of the bulb for outdoor use. When used outdoors, outdoor rainwater, falling on the protective cover, will slide down along the hemispherical top surface, avoiding residual water accumulation on the protective cover.

For convenient mounting, the bottom ring at the bottom end of the protective cover may be inserted and mounted into the inner side of the circular ring of the mounting disc through rotation. During the rotating process, the convex balls enter through the openings at the edge of the bottom ends of the tightening grooves. As the rotation continues, the convex balls gradually move upward in the tightening grooves along oblique directions, and at the same time, the protective cover and the bottom ring move downward. This continues until the bottom end of the bottom ring is fitted into the inner bottom of the mounting disc, completing a stable fixation.

BRIEF DESCRIPTION OF THE DRAWINGS

The accompanying drawings of the specification, which constitute a part of the present disclosure, are used to provide a further understanding of the present disclosure. The illustrative embodiments of the present disclosure and their description are used to explain the present disclosure, and do not constitute undue limitations to the present disclosure.

Figure 1:
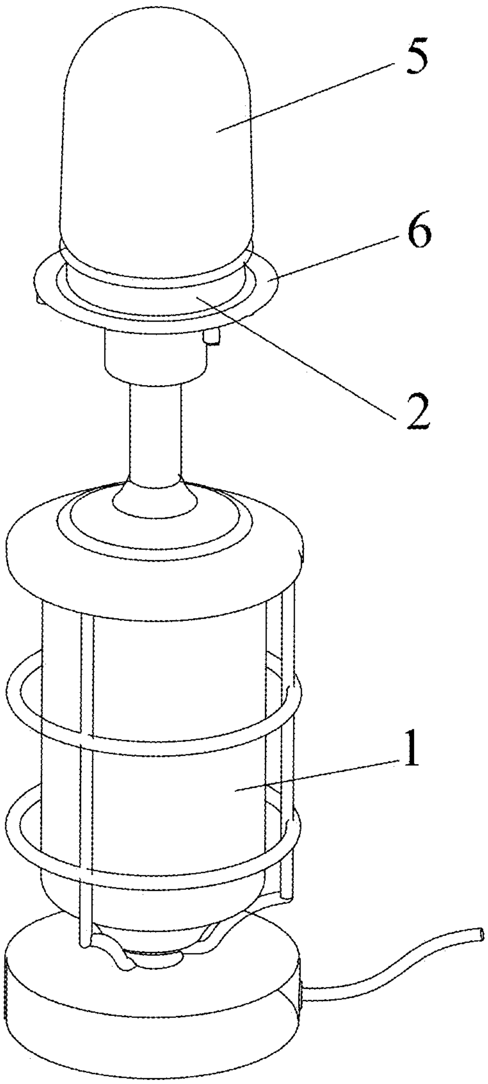
FIG. 1 is a first perspective view of a waterproof lamp in an embodiment of the present disclosure.

Illustration of reference numerals: 1: Body; 2: Mounting Disc; 3: Mounting Seat; 4: Bulb; 5: Protective Cover; 6: Mounting Ring; 7: Connecting Frame; 8: Outer Cover; 9: Convex Ball; 10: Smooth Edge; 11: Bottom Ring; 12: Tightening Groove.

DETAILED DESCRIPTION OF THE EMBODIMENTS

The present disclosure will be described below in detail with reference to the accompanying drawings and in conjunction with the embodiments. Various examples are provided by way of explanation of the present disclosure, rather than limiting the present disclosure. In fact, it will be clear to those skilled in the art that modifications and variations can be made to the present disclosure without departing from the scope or spirit of the present disclosure. For example, features shown or described as part of one embodiment may be used in another embodiment to yield yet another embodiment. Therefore, it is intended that the present disclosure encompasses such modifications and variations as come within the scope of the attached claims and their equivalents.

In the description of the present disclosure, the orientation or position relationships indicated by the terms such as "longitudinal," "transverse," "up," "down," "front," "rear," "left," "right," "vertical," "horizontal," "top" and "bottom" are based on the orientation and position relationship shown in accompanying drawings, and are only for convenience of description of the present disclosure, rather than requiring the present disclosure to be constructed and operated in a particular orientation, and thus cannot be understood as the limitations to the present disclosure. The terms such as "connection," "connected" and "provided" used in the present disclosure should be understood in a broad sense. For example, it may refer to a fixed connection or a detachable connection; it may refer to a direct connection or an indirect connection through an intermediate element; and it may refer to a wired electrical connection, a radio connection, or a wireless communication signal connection. For those skilled in the art, the specific meanings of the above terms can be understood according to specific conditions.

One or more examples of the present disclosure are shown in the attached accompanying drawings. The detailed description uses numerical and alphabetic marks to refer to the features in the accompanying drawings. Similar or analogue marks in the accompanying drawings and the description have been used to refer to similar or analogue parts of the present disclosure. As used herein, the terms such as "first," "second" and "third" are used interchangeably to distinguish one member from another, and are not intended to represent the position or importance of individual members.

Figure 2:
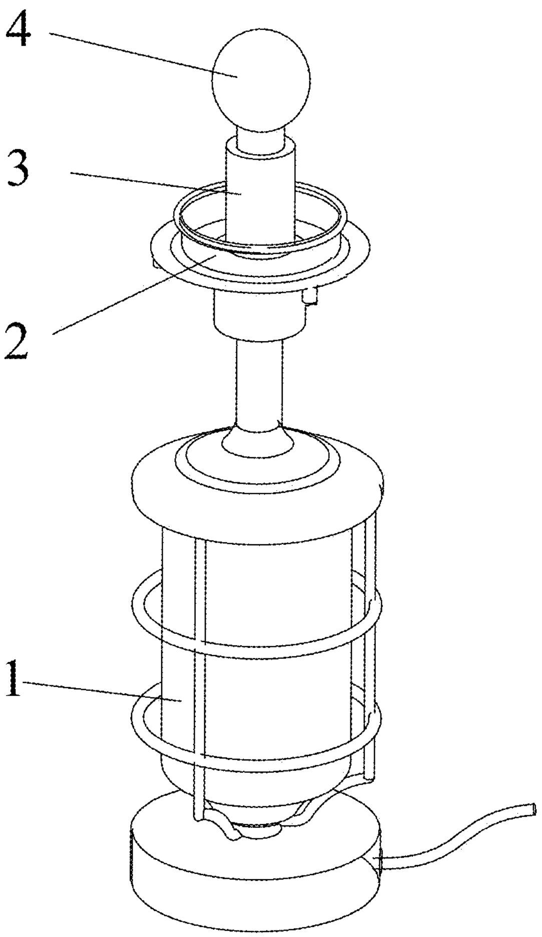
FIG. 2 is a second perspective view of a waterproof lamp in an embodiment of the present disclosure.
Figure 3:
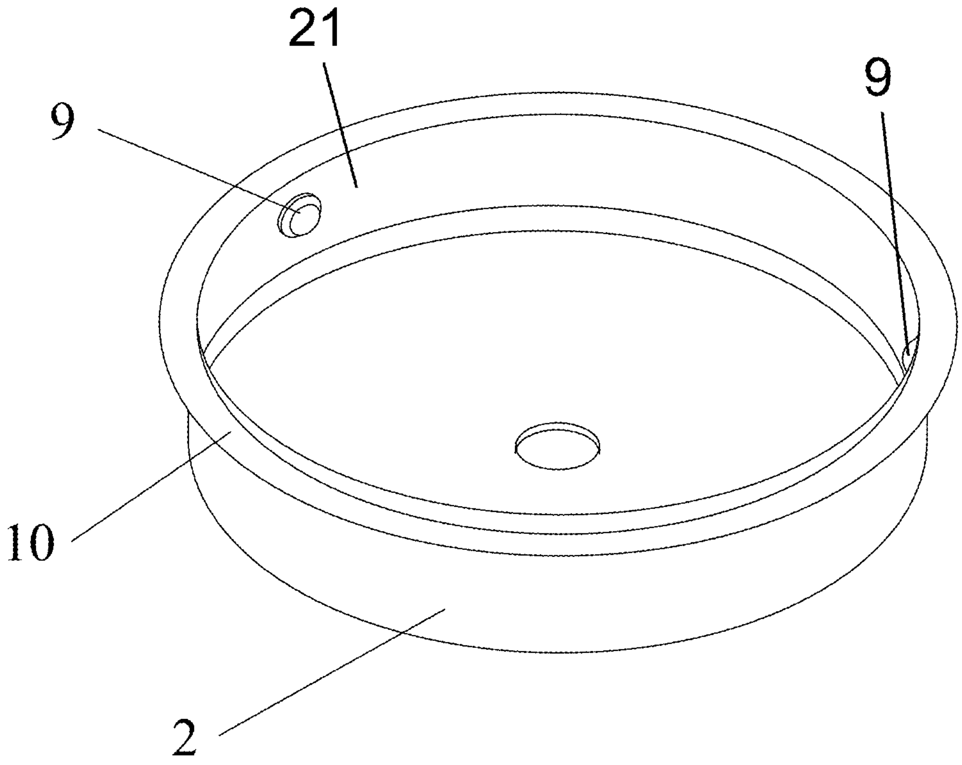
FIG. 3 is a perspective view of a mounting disc in the present disclosure.
Figure 4:
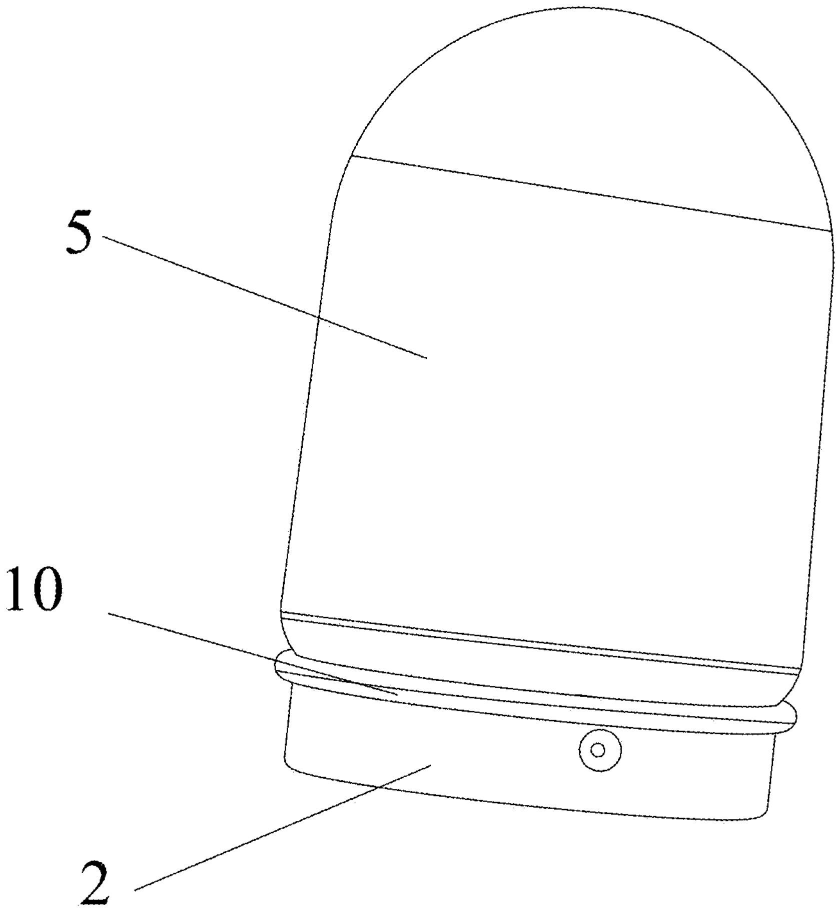
FIG. 4 is a perspective view of mounting between a mounting disc and a protective cover in the present disclosure.
Figure 5:
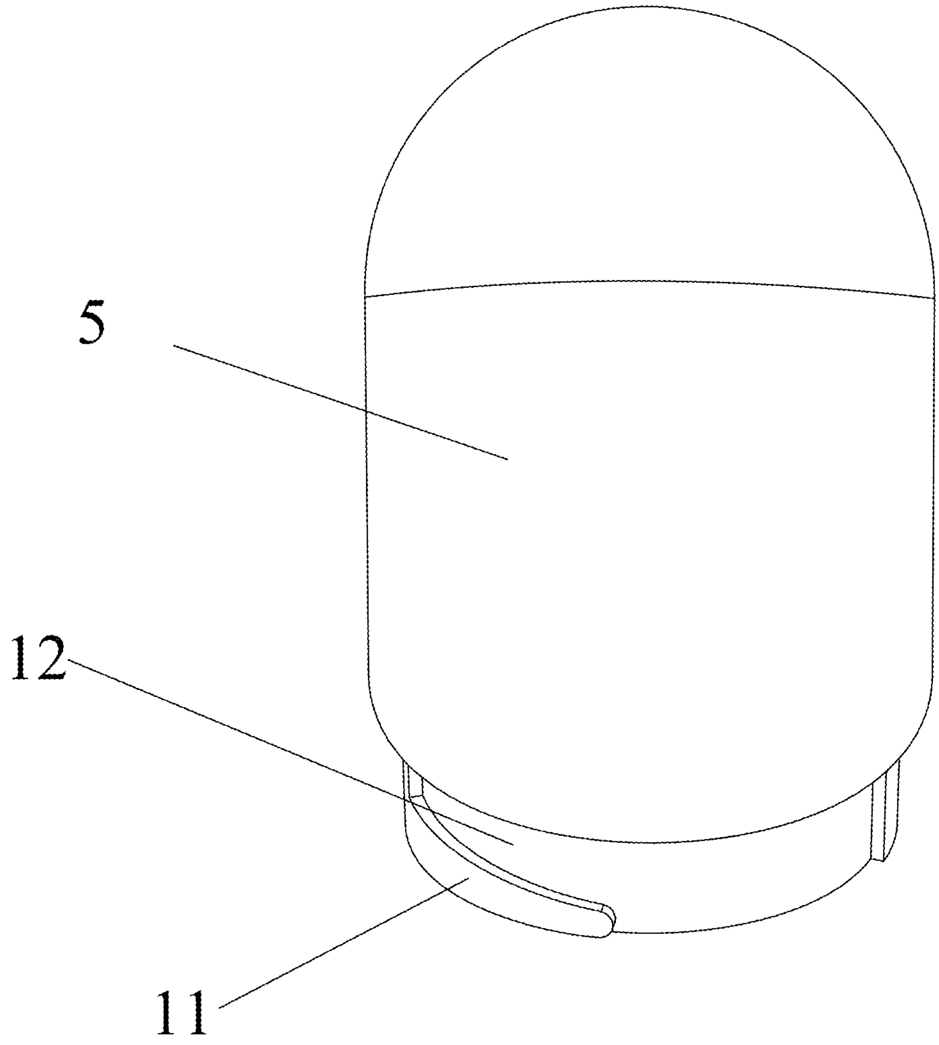
FIG. 5 is a perspective view of a protective cover in the present disclosure.
Figure 6:
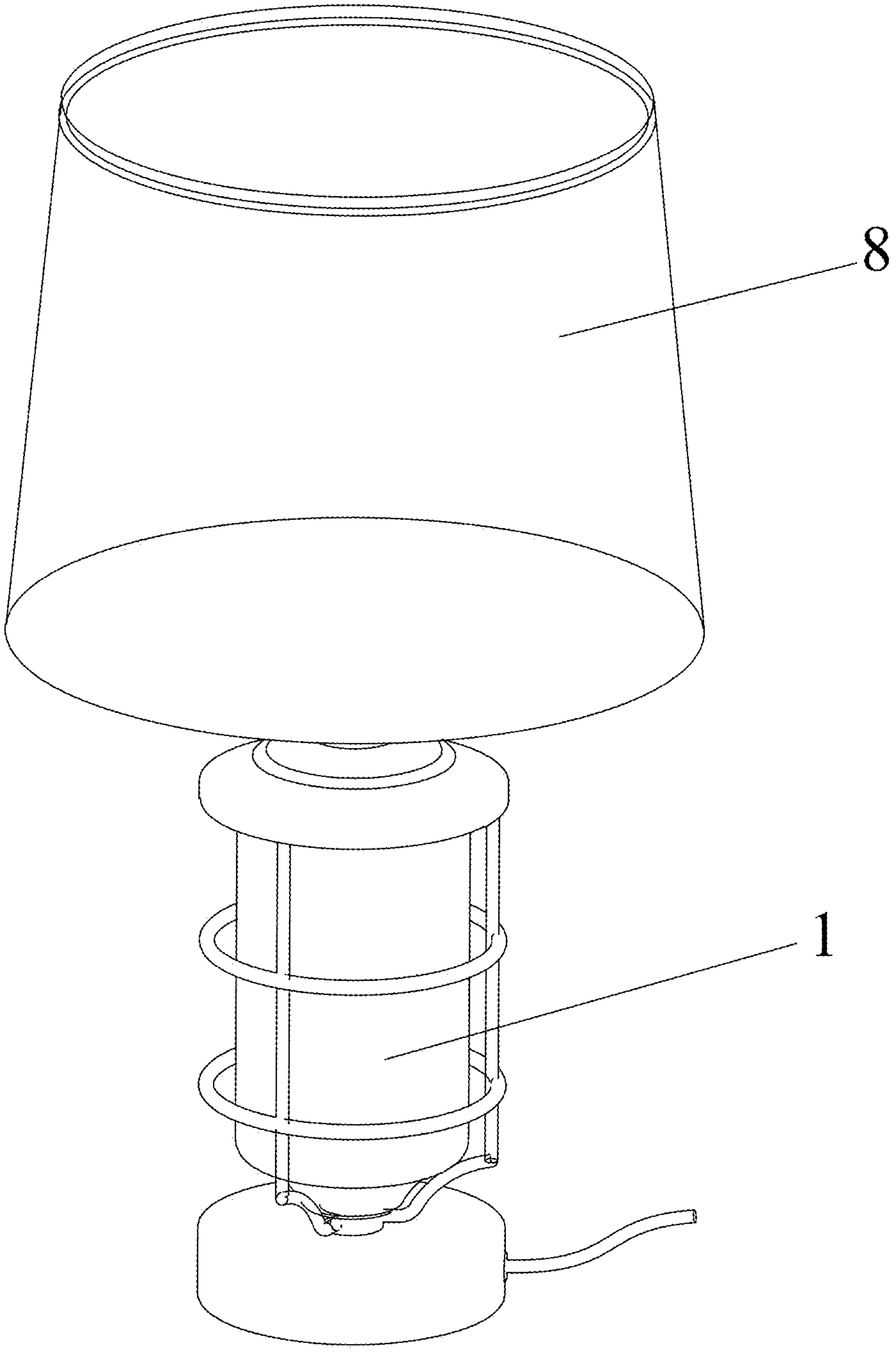
FIG. 6 is a third perspective view of a waterproof lamp in an embodiment of the present disclosure.
Figure 7:
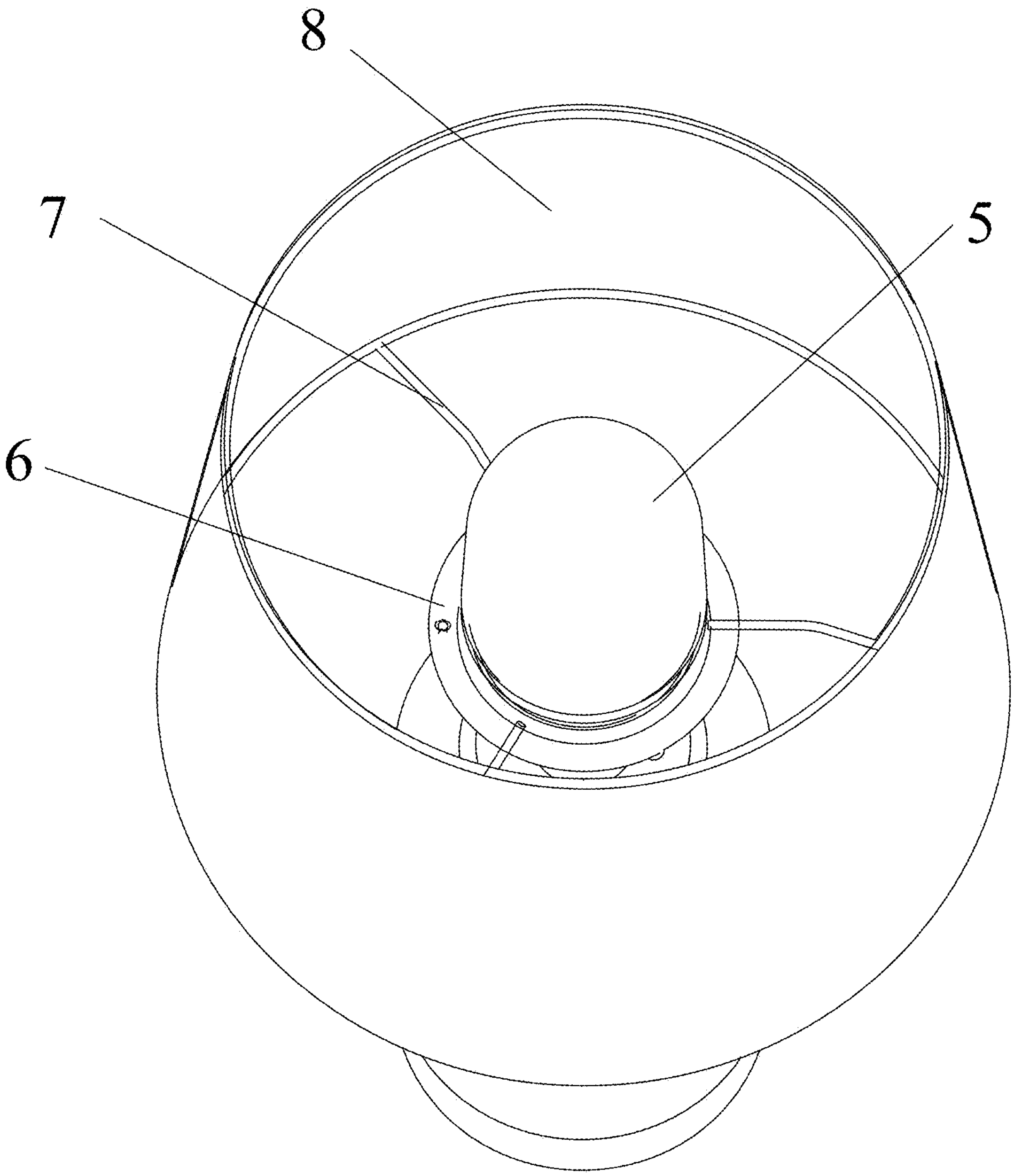
FIG. 7 is a fourth perspective view of a waterproof lamp in an embodiment of the present disclosure.

As shown in FIGS. 1-7, Embodiments 1-6 further illustrates a waterproof lamp.

Embodiment 1

A waterproof lamp includes a lamp holder. A bulb 4 and a protective cover 5 are mounted on the lamp holder, and the protective cover 5 is located outside the bulb 4. A mounting seat 3 is arranged at the top of the lamp holder, and the bulb 4 is mounted at the top of the mounting seat 3.

A mounting disc 2 is mounted on the lamp holder, the mounting seat 3 extends through the mounting disc 2, and a bottom end of the protective cover 5 is mounted in the mounting disc 2. A clamping member in the mounting disc 2 is engaged into a clamping groove in the bottom of the protective cover 5 to enable convenient mounting and fixation. The clamping member and the clamping groove are engaged through spiral rotation, allowing the protective cover 5 to be rotated and locked into place during the downward insertion into the mounting disc 2.

An outer edge of the mounting disc 2 extends upward to form a circular ring, and an inner side of the circular ring is mounted and connected with the bottom end of the protective cover 5. The bottom end of the protective cover 5 is insertable into the inner side of the circular ring of the mounting disc 2, enabling insertion and fixation in both up and down directions.

A bottom ring 11 is arranged at the bottom end of the protective cover 5, and an outer ring surface of the bottom ring 11 is mounted and connected with an inner ring surface 21 of the circular ring of the mounting disc 2.

The outer ring surface of the bottom ring 11 is provided with a plurality of tightening grooves 12, and the inner ring surface 21 of the circular ring of the mounting disc 2 is provided with a plurality of convex balls 9, where the tightening grooves 12 are the clamping grooves, and the convex balls 9 are the clamping members.

The tightening grooves 12 are oblique grooves, allowing easy rotation, insertion and disassembly during the mounting process.

Embodiment 2

On the basis of Embodiment 1, a waterproof lamp has a body 1 on which a lamp holder is arranged, a bulb 4 and a protective cover 5 are mounted on the lamp holder, and the protective cover 5 is located outside the bulb 4.

When used outdoors, the protective cover 5 is located at the outer side of the bulb 4, preventing external wind and rain, as well as debris, and isolate dust from the outside, ensuring that the bulb 4 can operate properly, and improving the environmental adaptability of the bulb 4 for outdoor use.

A mounting seat 3 is arranged at the top of the lamp holder, and the bulb 4 is mounted at the top of the mounting seat 3.

A mounting disc 2 is mounted on the lamp holder, the mounting seat 3 extends through the mounting disc 2, and the bottom end of the protective cover 5 is mounted in the mounting disc 2.

The mounting disc 2 surrounds the mounting seat 3, enabling the protective cover 5, upon mounting, to surround the outer side of the bulb 4.

The top end of the protective cover 5 is hemispherical.

When used outdoors, outdoor rainwater, falling on the protective cover 5, will slide down along the hemispherical top surface, avoiding residual water accumulation on the protective cover 5.

Embodiment 3

On the basis of Embodiment 2, an outer edge of the mounting disc 2 extends upward to form a circular ring, and an inner side of the circular ring is mounted and connected with the bottom end of the protective cover 5.

A bottom ring 11 is arranged at the bottom end of the protective cover 5, and an outer ring surface of the bottom ring 11 is mounted and connected with an inner ring surface 21 of the circular ring of the mounting disc 2.

The outer ring surface of the bottom ring 11 is provided with a plurality of tightening grooves 12, and the inner ring surface 21 of the circular ring of the mounting disc 2 is provided with a plurality of convex balls 9.

The tightening grooves 12 are oblique grooves, the bottom ends of the oblique grooves extend to the edge of the bottom end of the bottom ring 11 to form an opening in the bottom.

For convenient mounting, the bottom ring 11 at the bottom end of the protective cover 5 may be inserted and mounted into the inner side of the circular ring of the mounting disc 2 through rotation. During the rotating process, the convex balls 9 enter through the opening at the edges of the bottom ends of the tightening grooves 12. As the rotation continues, the convex balls 9 gradually move upward in the tightening grooves 12 along oblique directions, and at the same time, the protective cover 5 and the bottom ring 11 move downward. This continues until the bottom end of the bottom ring 11 is fitted into the inner bottom of the mounting disc 2, completing a stable fixation.

Embodiment 4

Different from Embodiment 3, the bottom ring 11 is in threaded connection with the circular ring of the mounting disc 2.

Different from the mounting structure in Embodiment 3, a different threaded mounting structure is employed. The outer side of the bottom ring 11 is provided with threads, and the inner side of the circular ring of the mounting disc 2 is provided with threads, which can achieve threaded connection, forming another mounting structure.

Embodiment 5

On the basis of Embodiment 3, a smooth edge is arranged at the top of the circular ring of the mounting disc 2, and an outer diameter of the protective cover 5 is greater than that of the mounting disc 2.

When it is raining outside, the rainwater falls on the protective cover 5 and begins to flow down along its surface. Since the outer diameter of the protective cover 5 is greater than that of the mounting disc 2, the rainwater cannot enter the interior of the mounting disc 2 through a gap between the protective cover 5 and the circular ring of the mounting disc 2.

When flowing to the lower side of the outer surface of the protective cover 5, the rainwater is guided directly onto the smooth edge 10. The downward flowing rainwater is received by the smooth edge 10 protruding outwards, allowing the rainwater to continue flowing down to the ground. This prevents the rainwater from entering the interior of the lamp holder, providing an effective protection against rainwater ingress.

Embodiment 6

On the basis of Embodiment 5, a mounting ring 6 is mounted at the outer side of the lamp holder, an outer cover 8 is mounted on the mounting ring 6 through a connecting frame 7, and the outer cover 8 surrounds the protective cover 5.

The entire outer cover 8 is in the shape of a truncated cone with a small top and a large bottom, and its inner side is hollow and cylindrical, providing an effective protection for the protective cover 5 at the inner side.

The outer cover 8 is a truncated cone with a small top and a large bottom, the interior of the outer cover 8 is hollow, and the entire outer cover 8 is in the shape of a cylinder running through from top to bottom.

In this embodiment, the outer cover 8 provides protection around all sides of the lamp body, and also play a role in concentration light source.

Specifically, in outdoor usage scenarios, light concentration in a small area can be achieved, preventing light from dispersing over a long distance, which would otherwise reduce brightness at a close distance. This improves the brightness in a small area, and helps keep phototropic mosquitoes away, offering protection.

The described contents of the above embodiments are more detailed and specific, and express the preferred embodiments of the present disclosure, which are only used to illustrate the technical concepts and features of the present disclosure, with the purpose of enabling the skilled in the art to understand and accordingly implement the contents of the present disclosure. However, these embodiments should not be regarded as limiting the patent scope of the present disclosure. For researchers or technicians in the art, any equivalent changes or modifications made under the spirit disclosed by the present disclosure, such as partial improvements within the system or the alternations, transformations and the like among the subsystems without departing from the structure of the present disclosure are still within the patent scope of the present disclosure.

What is claimed is:

1. A waterproof lamp comprising a lamp holder, wherein a bulb (4) and a protective cover (5) are mounted on the lamp holder, and the protective cover (5) is located outside the bulb (4);

a mounting seat (3) is arranged at a top of the lamp holder, and the bulb (4) is mounted at a top of the mounting seat (3);

a mounting disc (2) is mounted on the lamp holder, the mounting seat (3) extends through the mounting disc (2), and a bottom end of the protective cover (5) is mounted in the mounting disc (2);

the bottom end of the protective cover (5) is provided with a bottom ring (11), an outer ring surface of the bottom ring (11) is provided with a spiral tightening groove (12); the spiral tightening groove (12) does not communicate with an interior of the protective cover (5);

a convex ball (9) provided on an inner ring surface of the mounting disc (2) is engaged into the spiral tightening groove (12), such that the bottom ring (11) is connected with the mounting disc (2); and a groove wall of the spiral tightening groove (12) has a spiral slope, the convex ball (9) and the spiral tightening groove (12) are engaged by the spiral slope, allowing the protective cover (5) to be rotated and locked into place during downward insertion into the mounting disc (2).

2. The waterproof lamp according to claim 1, wherein a top end of the protective cover (5) is hemispherical;

an outer edge of the mounting disc (2) extends upward to form a circular ring, and an inner side of the circular ring is mounted and connected with the bottom end of the protective cover (5); and the bottom end of the protective cover (5) is insertable into the inner side of the circular ring of the mounting disc (2), enabling insertion and fixation in both up and down directions.

3. The waterproof lamp according to claim 1, wherein the inner ring surface of the circular ring of the mounting disc (2) is provided with a plurality of convex balls (9).

4. The waterproof lamp according to claim 1, wherein a smooth edge (10) protruding outwards is arranged at a top of the circular ring of the mounting disc (2).

5. The waterproof lamp according to claim 1, wherein a mounting ring (6) is arranged outside the lamp holder, and an outer cover (8) is arranged outside the mounting ring (6).

6. The waterproof lamp according to claim 1, wherein the spiral tightening groove (12) is recessed into the bottom ring (11).

7. The waterproof lamp according to claim 1, wherein the spiral tightening groove (12) comprises an open end and a closed end, the convex ball (9) is allowed to be locked into the spiral tightening groove (12) through the open end, a width of the spiral tightening groove (12) is gradually reduced from the open end to the closed end, thereby forming the spiral slope.

8. The waterproof lamp according to claim 5, wherein the outer cover (8) is mounted on the mounting ring (6) by a connecting frame (7), and the outer cover (8) surrounds the protective cover (5).

9. The waterproof lamp according to claim 8, wherein the outer cover (8) is in the shape of a truncated cone with a narrower top and a wider bottom, an interior of the outer cover (8) is hollow, and the entire outer cover (8) is in a shape of a cylinder running through from top to bottom.

* * * * *